United States Patent
Ricketts

(10) Patent No.: US 8,197,312 B2
(45) Date of Patent: Jun. 12, 2012

(54) EXTENSION FOR AN AGRICULTURAL COMBINE UNLOADER TUBE

(75) Inventor: Jonathan E. Ricketts, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 170 days.

(21) Appl. No.: 12/631,393

(22) Filed: Dec. 4, 2009

(65) Prior Publication Data

US 2011/0136556 A1    Jun. 9, 2011

(51) Int. Cl.
*A01D 17/02* (2006.01)
*A01F 12/46* (2006.01)

(52) U.S. Cl. ........................................................ 460/114

(58) Field of Classification Search .................. 460/114, 460/119, 131; 414/526, 523, 505, 518; 198/665, 198/531, 674, 672, 671
See application file for complete search history.

(56) References Cited

U.S. PATENT DOCUMENTS

| | | | |
|---|---|---|---|
| 355,212 A | 12/1886 | Roberts | |
| 608,585 A | 8/1898 | Dentler | |
| 1,366,899 A | 2/1921 | Bell | |
| 1,538,665 A | 5/1925 | Sinclair | |
| 2,883,076 A * | 4/1959 | Palmer | 414/526 |
| RE24,920 E * | 1/1961 | Palmer | 414/526 |
| RE26,347 E | 2/1968 | Oury | |
| 4,037,745 A * | 7/1977 | Hengen et al. | 414/504 |
| 5,103,623 A | 4/1992 | Herrett | |
| 5,167,581 A * | 12/1992 | Haag | 460/114 |
| 5,359,838 A * | 11/1994 | Madsen | 56/16.6 |
| 5,538,388 A * | 7/1996 | Bergkamp et al. | 414/523 |
| 5,558,282 A * | 9/1996 | Ameye et al. | 241/60 |
| 5,575,316 A * | 11/1996 | Pollklas | 141/198 |
| 5,749,783 A * | 5/1998 | Pollklas | 460/119 |
| 5,979,151 A | 11/1999 | Sanders et al. | |
| 6,042,326 A * | 3/2000 | Thomas et al. | 414/502 |
| 6,247,886 B1 | 6/2001 | Signer et al. | |
| 6,248,015 B1 | 6/2001 | Rayfield et al. | |
| 6,261,050 B1 * | 7/2001 | Kuhns | 414/526 |
| 6,358,143 B1 * | 3/2002 | Hurlburt | 460/114 |
| 6,367,234 B1 * | 4/2002 | Hurlburt | 56/16.6 |
| 6,497,546 B2 | 12/2002 | Wood et al. | |
| 6,632,135 B2 | 10/2003 | Matousek et al. | |
| 6,638,159 B2 * | 10/2003 | Krone et al. | 460/114 |
| 6,669,240 B1 | 12/2003 | Signer et al. | |
| 6,767,174 B2 * | 7/2004 | Cresswell | 414/523 |
| 6,908,380 B2 | 6/2005 | Silver | |
| 6,939,222 B2 | 9/2005 | Grossjohann et al. | |
| 7,003,938 B2 * | 2/2006 | Erdmann et al. | 56/228 |
| 7,040,980 B1 | 5/2006 | Kestel | |
| 7,198,450 B2 | 4/2007 | Matousek et al. | |
| 7,452,180 B2 | 11/2008 | Talbi et al. | |
| 7,527,555 B2 | 5/2009 | Grotelueschen et al. | |
| 7,584,836 B2 * | 9/2009 | McCully et al. | 198/671 |
| 7,644,816 B2 * | 1/2010 | Veiga Leal et al. | 198/671 |

FOREIGN PATENT DOCUMENTS

JP    04004812 A    1/1992

(Continued)

*Primary Examiner* — Arpad Fabian-Kovacs
(74) *Attorney, Agent, or Firm* — Michael G. Harms

(57) ABSTRACT

An agricultural combine unloader extension is provided that can be used to extend the reach of conventional unloader tubes and for preventing the loss of crop material residing within the unloader tube from falling out and becoming waste. The unloader extension is hingedly connected to the unloader tube, wherein a drive mechanism is configured to rotate the unloader extension about a vertical axis from a discharging position to a closed or storage position.

11 Claims, 7 Drawing Sheets

FOREIGN PATENT DOCUMENTS

| | | |
|---|---|---|
| JP | 2002209429 A | 7/2002 |
| JP | 2003180147 A | 7/2003 |
| JP | 2004089110 A | 3/2004 |
| JP | 2006238897 A | 9/2006 |

* cited by examiner

EXTENSION FOR AN AGRICULTURAL COMBINE UNLOADER TUBE

BACKGROUND OF THE INVENTION

The present invention relates generally to agricultural combine unloaders. In particular, the present invention relates to a hinged unloader extension that can pivot between a discharge position and a closed position.

An agricultural combine is a common and well-known machine for harvesting crop materials. Agricultural combines are available in various designs and models to perform the basic functions of reaping crop materials from a crop field, separating the grain from the non-grain crop materials, and discarding the non-grain crop materials back onto the crop field.

A typical combine includes a crop harvesting apparatus, or header, which reaps ripened crop plants from the crop field and feeds the crop materials to a separating or threshing system. Several different types of threshing systems are available, such as rotary threshers and straw walkers. Regardless of the type of threshing system used, the thresher separates the course non-grain materials from the grain heads. The course non-grain material primarily consists of grain stalks and exits the thresher along its rear end. The grain heads, on the other hand, exit the thresher along the bottom side of the thresher and pass to a series of moving sieves. The sieves separate the grain from the unwanted fine materials, sometimes referred to as chaff. After separation, the grain is directed to a grain bin through an auger system, and the unwanted fine materials exit the sieves along the rear end.

The grain bin serves as a temporary onboard storage location for the grain. Typically, the grain bin is positioned above the threshing system and can have a capacity of as much as 200 bushels for larger combines. As the combine harvests the crop field, the grain bin periodically becomes filled with grain and must be emptied to allow the combine to proceed. The grain is then transferred from the grain bin to a truck or a grain cart through an unloader tube.

The unloader tube is a well-known device to those skilled in the art of combines. Most manufacturers of combines have adopted a similar configuration for the unloader tube. In the common configuration, the unloader tube is positioned along the upper side of the combine with the infeed section of the auger located adjacent to the grain bin. The infeed section is pivotally attached to the combine to allow rotation about a nearly vertical axis. A 90 degree elbow connects the infeed section to a long horizontal section. The horizontal section can then rotate in a generally horizontal plane around the infeed end. With this design the unloader tube can be rotated out to a 90 degree angle from the combine to allow unloading into a truck or grain cart. After unloading, the unloader tube is rotated back so that the horizontal section trails towards the rear of the combine with the exit end located near the combine's rear end.

While this configuration for the unloader tube has been a convenient solution for the need to unload the combine's grain bin, the long length of such unloader tubes presents a number of problems for both the farmer and the manufacturer. These problems are exacerbated by the increasing production capacity of newer combines which require ever longer unloader tubes due to the increased header width of today's combines.

In order to satisfy farmers' demands for more efficient harvesting equipment, manufacturers have regularly increased the width of the combine header. Currently, some combine headers are as wide as forty feet, and even larger widths are eventually possible. In addition, farmers are increasingly turning to the use of grain carts and unloading the combine's onboard grain bin into an adjacent travelling grain cart while the combine is still harvesting through the field. Frequently, the grain cart is towed by an agricultural tractor which has dual sets of tires installed on it. With this unloading arrangement, the unloading auger must extend over a substantial distance in order to reach the grain cart, including the width of the header, the safety clearance between the header and the tractor tires, and the width of the grain cart and tractor.

Current unloader tubes also prevent farmers from implementing a technique known as controlled traffic patterning. In a controlled traffic pattern, the combine unloads grain into an adjacent travelling grain cart like previously described. However to avoid additional soil compaction, the tow tractor and grain cart travel along the combine's prior tire path which is located one swath away from the combine's current travel path. Thus, by reusing the same tire path that has already been created by the combine, more ground soil is left uncompacted, which allows better growing conditions for subsequent crops. Controlled traffic pattern harvesting, however, requires even longer unloader tubes than are generally available in order to span the entire distance between the combine's current and prior tire paths.

Typically, prior art unloader tubes are lengthened by extending the length of the horizontal section and allowing an extended portion to extend beyond the rear end of the combine. This extended portion can raise the manufacturer's shipping costs for the combine significantly. Shipping costs are often calculated based on the volume of the shipped product. This is especially true when a combine is shipped overseas on a ship. In these cases, if the manufacturer chooses to install the unloader tube at the factory, the extended portion can require as much as 10% more shipping volume than would otherwise be required, substantially increasing the cost of shipping. On the other hand, the manufacturer may choose to ship the unloader tube separately to avoid this cost penalty. However, this alternative suffers from the problems of ensuring that the correct parts are shipped to the customer and that they are properly installed once received.

The extended portion also requires additional storage space on the farm. Farmers typically store their agricultural equipment in large buildings when the equipment is not being used in order to minimize weather related deterioration. Hereto, the extended portion limits the amount of equipment that can be stored in the storage building because other equipment must be positioned behind the end of the unloader tube instead of directly behind the combine's rear end.

Problems also occur when the farmer is operating the combine during harvesting operations. The long horizontal section of the unloader tube makes the overall length of the combine extra long and creates a collision hazard for the extended portion. Farmers operate their combines around a variety of different obstacles, which can be accidentally struck by the extended portion. Examples of these obstacles include trees, telephone poles, buildings, and other vehicles. The risk of rear end collisions is especially great with combines because the large size of the combine and the minimum amount of rearward visibility makes it difficult to see nearby obstacles. When a collision does occur with the unloader tube, the cost to the farmer can be quite high. Not only is the object struck damaged, but the unloader tube will likely be disabled. As a result, the farmer incurs repair costs, and the harvesting operation is delayed until the unloader tube can be fixed.

To minimize the risk of rear end collisions, some countries have implemented transportation regulations that require a combine to be able to turn around within a specified radius without any portion of the combine passing outside the radius. This type of regulation requires that the combine be designed as compact as possible. Satisfying a regulation like this is especially difficult with an unloader tube that extends beyond the rear end of the combine.

Moreover, the ever increasing length of unloader tubes means that more residual grain is left in them after unloading to a grain cart is completed, as it may take several grain charts to unload the combine. The residual grain in the unloader tube falls out, or dibbles out, of the unloader tube as the combine continues harvesting due to the movement of the combine across the field. This loss of residual grain results in a substantial waste of harvested grain and ultimately revenue for farmers.

Therefore, there exits a need for a means to extend the unloader tube's reach for unloading grain in today's larger agricultural combines while minimizing waste associated with such larger unloader tubes.

BRIEF SUMMARY OF THE INVENTION

The present invention provides an agricultural combine unloader comprising: an unloader tube connected to the agricultural combine, the unloader tube including: an interior passageway, and an auger within the interior passageway for conveying crop material therethrough to a discharge end; an unloader extension that includes: an inlet end for receiving crop material from the discharge end of the unloader tube, and an outlet end for discharging the crop material; and a drive mechanism operatively connected to the discharge end of the unloader tube to position the unloader extension in at least a discharge position to discharge the crop material from the unloader tube and a closed position to cover the discharge end of the unloader tube, the drive mechanism including a turret, wherein the inlet end of the unloader extension is pivotably connected to the turret.

The present invention provides an agricultural combine unloader comprising: an unloader tube connected to the agricultural combine, the unloader tube including: an interior passageway, and an auger within the interior passageway for conveying crop material therethrough to a discharge end having a downwardly facing planar opening; an unloader extension that includes: an inlet end for receiving crop material from the discharge end of the unloader tube, an outlet end for discharging the crop material, and a planar surface connecting the inlet end and outlet end; a drive mechanism that includes: a turret operatively connected to the discharge end of the unloader tube for rotation about a substantially vertical axis, and a pivot mechanism, wherein the inlet end of the unloader extension is pivotably connected to the turret and the pivot mechanism is operatively connected to the unloader extension to pivot the unloader extension relative to the axis of rotation of the turret; and wherein the pivot mechanism pivots the unloader extension between a closed position wherein the planar surface of the unloader extension covers the downwardly facing planar opening of the discharge end of the unloader tube and an open position wherein the planar surface of the unloader extension is at an angle with respect to horizontal to allow for the flow of crop material from the discharge end of the unloader tube to the outlet end of the unloader extension.

The present invention solves the problems associated with longer unloader tubes and the impact such longer unloader tubes have on waste levels for harvested grain by engendering a unloader extension that can extend the reach of the unloader tube, yet can be retracted, and which can minimize waste of the harvested grain by sealing off the unloader tube when not in use.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
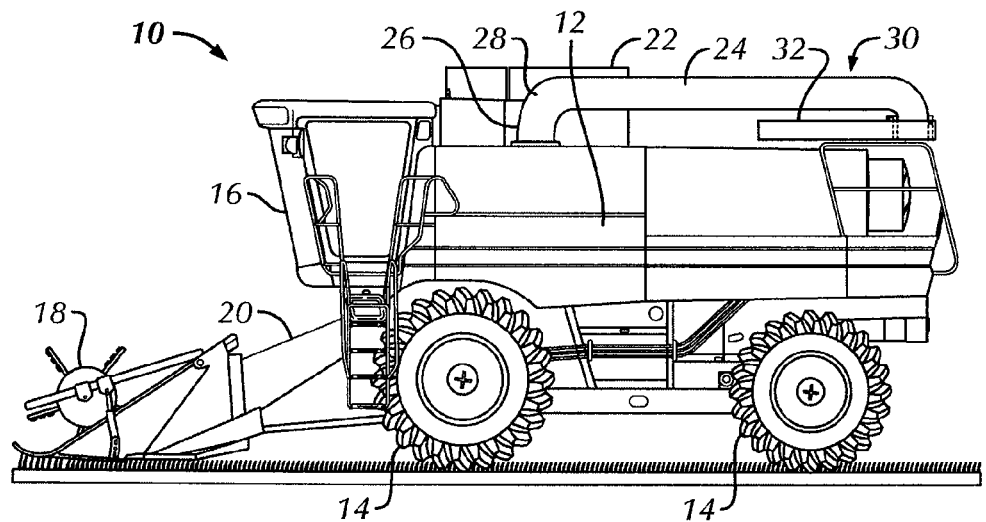
FIG. 1 is a side, elevational view of an agricultural combine with an unloader tube and unloader extension in a storage position in accordance with a preferred embodiment of the present invention.

Referring to FIG. 1, there is shown a self-propelled agricultural combine 10. The combine 10 includes a body 12 supported by wheels 14 and an engine (not shown) for driving the wheels 14 to allow the combine 10 to move from place to place. An operator's station 16 is positioned towards the forward end of the combine body 12 and includes numerous controls to allow the operator to adjust the functions of the combine 10.

At the forward end of the combine 10 is a crop harvesting header 18 that severs and gathers the ripened crop materials from the crop field. After cutting the stems of the crop materials or collecting the crop materials from a prepared windrow, the crop materials are fed rearward through a feeder housing 20 to the combine's internal threshing systems (not shown). The threshing systems then separate the grain from the unwanted crop residue. Because the present invention is applicable to a variety of different threshing systems and because threshing systems are generally well-known to those skilled in the art, a detailed discussion of the structure, function and operation of such threshing systems is not necessary for a complete understanding of the present invention. After the threshing systems have separated the grain from the crop residue, the grain is transferred to an onboard storage bin 22 by a transfer system, such as an augering system, and the unwanted crop residue is discharged from the rear end of the combine 10 onto the harvested crop field.

Figure 3:
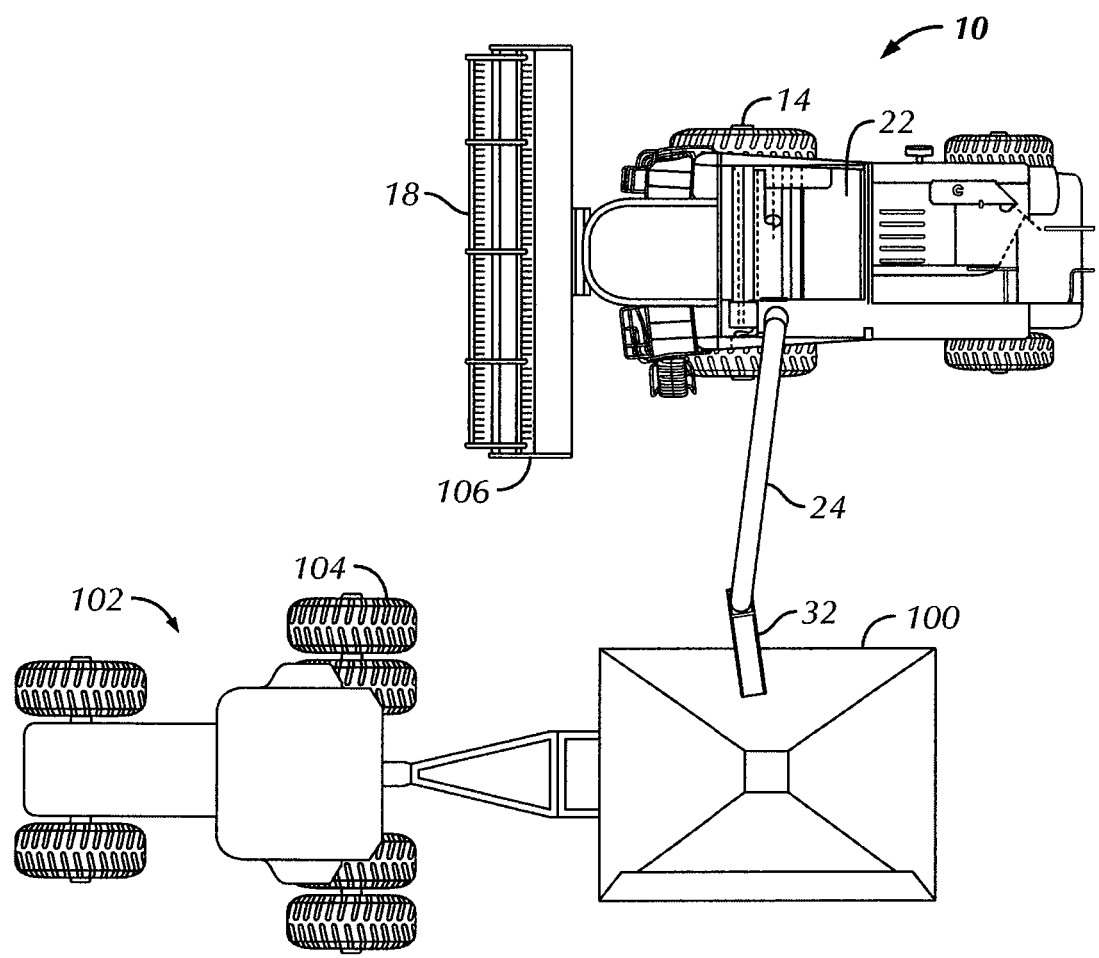
FIG. 3 is a top plan view of the agricultural combine of FIG. 1 with the unloader tube and unloader extension in a discharge position and a grain cart positioned to receive grain from the unloader tube and extension.

When the onboard storage bin 22 becomes full with grain, an unloader tube 24 empties the grain from the storage bin 22 into a truck or a grain cart 100 (FIG. 3). Most manufacturers use a similar configuration for the unloader tube 24 that is well-known in the art. The unloader tube 24 includes an infeed section 26 that is positioned adjacent to the storage bin 22 and is oriented along a substantially vertical axis that leans rearward about 12 degrees. The input end (not shown) of the infeed section 26 is positioned within the storage bin 22 near its bottom side so that the grain will feed up into the infeed section 26 when the unloader tube 24 is turned on. The unloader tube 24 is part of the combine's unloader system (i.e., unloader). Such unloaders are well known in the art and a detailed description of their structure, function and operation is not necessary for a complete understanding of the present invention. An exemplary unloader is described in U.S. Pat. No. 7,452,180, the disclosure of which is hereby incorporated by reference in its entirety.

The infeed section 26 is pivotally connected to the combine 10 around the infeed section's 26 vertical axis. The infeed section 26 can then be rotated about its vertical axis by a hydraulic cylinder (not shown) that is connected on one end to a lever (not shown) attached to the infeed section 26. At the top end of the infeed section 26, an elbow 28 connects the infeed section 26 to the horizontal outfeed section 30 of the unloader tube 24. The horizontal outfeed section 30 is oriented 90 degrees from the infeed section 26 and lies along a substantially horizontal axis. Thus, when the infeed section 26 is pivoted, the horizontal outfeed section 30 rotates around the infeed section 26 in a generally horizontal plane with the outfeed section 30 rising slightly as it is rotated outwards.

The combine operator controls the position of the unloader tube 24 with remote controls provided in the operator's station 16. The unloader tube 24 rotates between a storage or closed position (FIG. 2) and an unloading or discharge position (FIG. 3). In the unloading position, the horizontal section 30 is rotated out so that it is substantially transverse to the longitudinal axis of the combine body 12. A truck or grain cart 100 (FIG. 3) is then positioned to receive the grain from the unloader tube 24 in order to unload the onboard storage bin 22. When the unloader tube 24 is not being used, the horizontal section 30 is rotated back into the storage position so that it is generally parallel to the longitudinal axis of the combine body 12.

Figure 4:
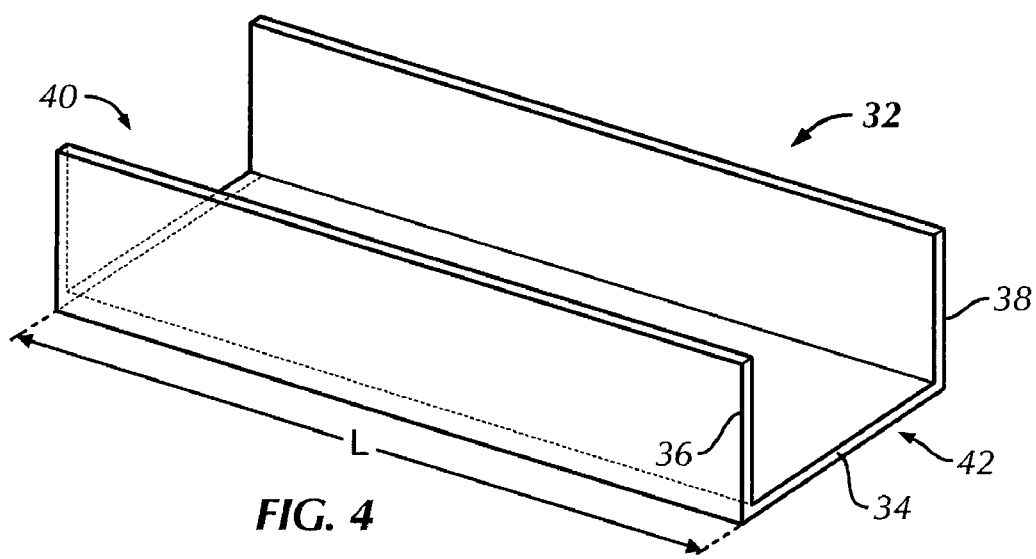
FIG. 4 is a perspective view of an unloader extension in accordance with a preferred embodiment of the present invention.

FIG. 4 illustrates a preferred embodiment of the unloader extension 32 that is pivotably and rotatably connected to the unloader tube 24. The extension 32 is generally configured with three sides, a bottom portion 34, and two side portions 36 and 38. Preferably, the extension 32 is configured with a bottom portion 34 that is a substantially horizontal planar surface 34. The extension 34 includes an inlet end 40 for receiving a flow of crop material from a discharge end 44 of the unloader tube 24 and an outlet end 42 for discharging the crop material from the extension 32. The planar surface 34 connects the inlet end 40 and outlet end 42. Extension 32 generally functions as chute for discharging crop material feed from the unloader tube 24. The extension 32 can be configured with a length L that is sufficient for its intended use. For example, the length L can range from one feet to over twenty five (25) feet. The extension 32 can be formed from any rigid material suitable for its intended use, such as metal (e.g., stainless steel), plastics, composites, or the like.

Figure 5:
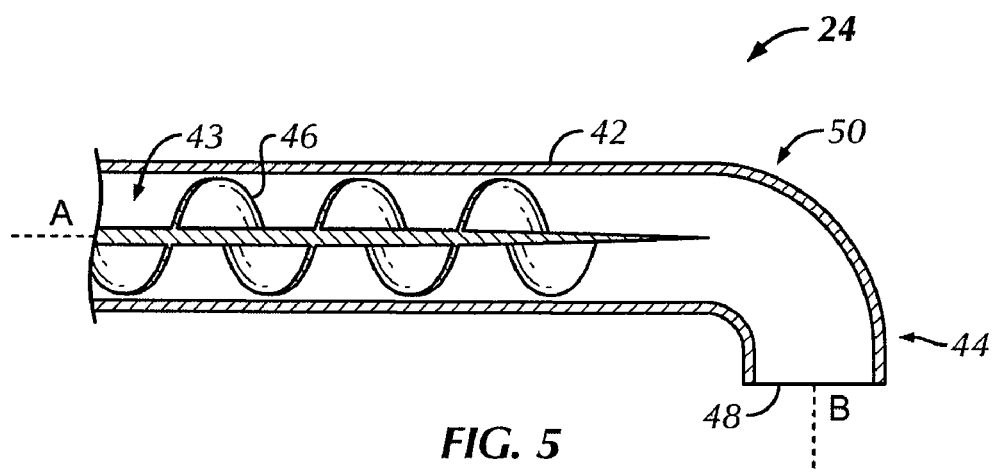
FIG. 5 is a side, elevational cross-sectional view of the unloader tube of FIG. 1.

The extension 32 is operatively connected to the discharge end 44 of the unloader tube 24. Referring to FIG. 5, the unloader tube 24 is generally configured with a tubular housing 42 having an interior passageway 43 and a discharge end 44. The tubular housing 42 houses an auger 46 for conveying the crop material through the unloader tube 24. The unloader tube 24 is configured to extend generally horizontally from the combine 10.

The discharge end 44 is generally configured with a substantially planar and circular discharge opening 48. The discharge opening 48 can be configured with any orientation relative to the unloader tube 24, but is preferably configured with a downwardly facing planar opening 48 orientation, as shown in FIG. 5. That is, the discharge end 44 is preferably configured with about a 90 degree elbow 50, such that the discharge opening 48 is facing substantially downwardly.

Figure 6A:
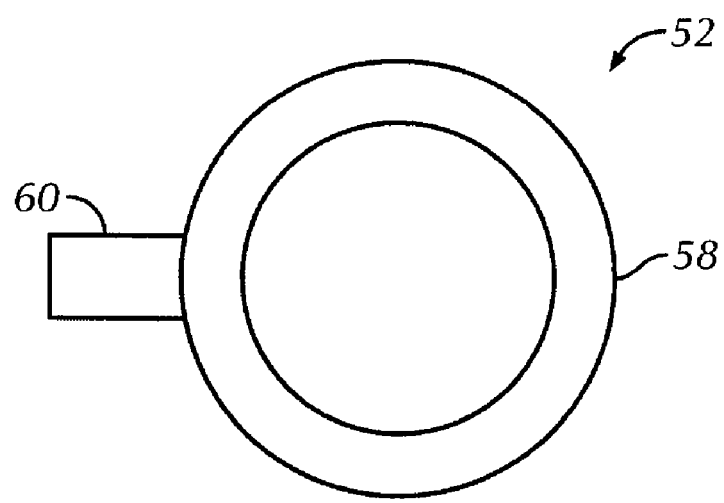
FIG. 6A is a top plan view of a drive mechanism for the unloader tube and unloader extension of FIG. 1 that includes a turret and a pivot mechanism.
Figure 6B:
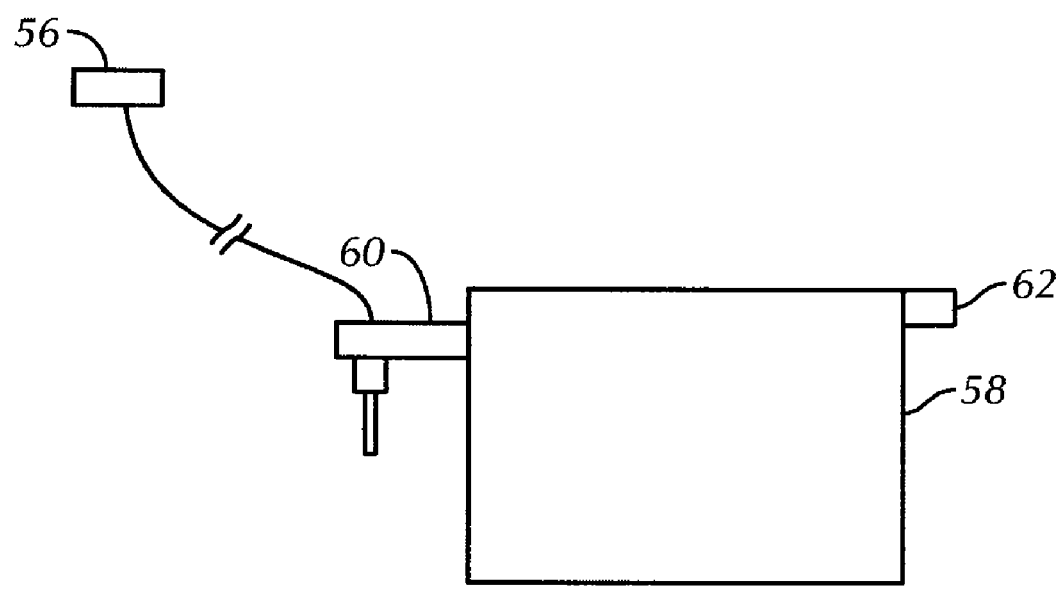
FIG. 6B is a side, elevational view of the drive mechanism of FIG. 6A.
Figure 7:
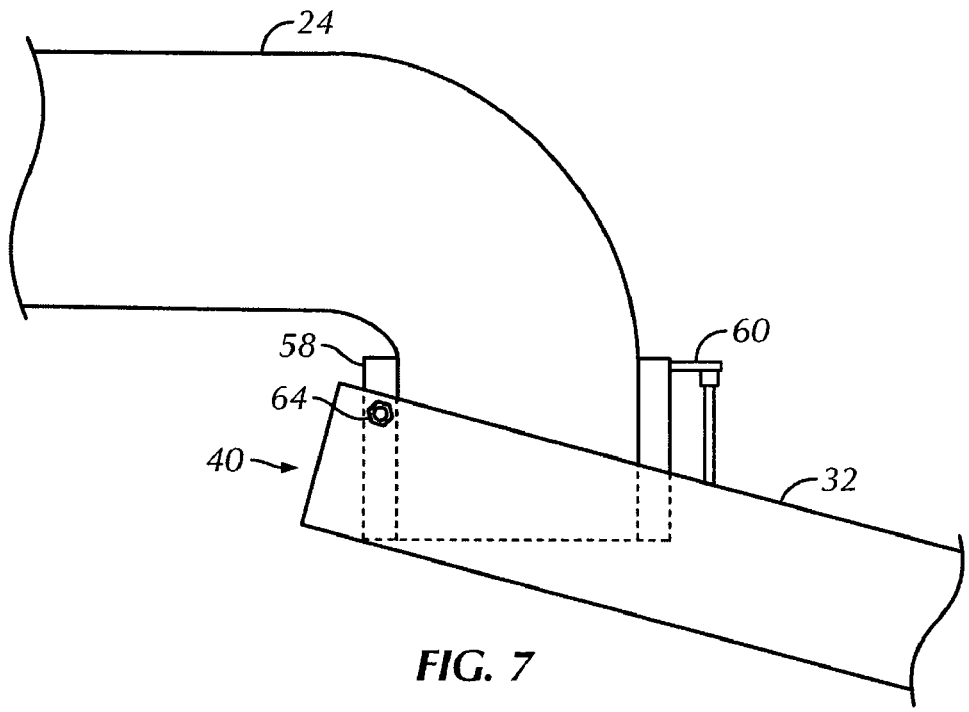
FIG. 7 is an enlarged side elevational view of the unloader extension of FIG. 4 connected to the unloader tube of FIG. 5 in a discharge position.
Figure 8:
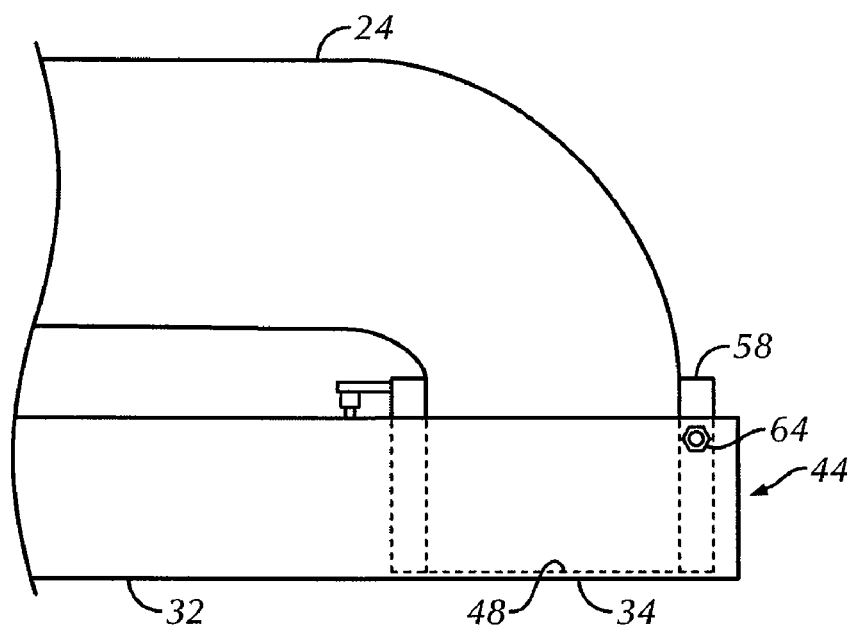
FIG. 8 is an enlarged side elevational view of the unloader extension of FIG. 4 connected to the unloader tube of FIG. 5 in a closed position.

Referring to FIGS. 6A, 6B and 7 the extension 32 is connected to the unloader tube 24 by a drive mechanism 52 that positions the extension 32 in a plurality of positions, such as a discharge position for unloading the grain and a closed position to close off and seal the discharge end 44 of the unloader tube 24. The drive mechanism 52 is operatively connected to the extension 32 to selectively position the extension 32 in at least a discharge position (FIG. 7) and a close position (FIG. 8). The drive mechanism 52 can include a pivot mechanism 60 that is connected to a power supply 56, such as the combine's general power supply (i.e., battery or alternator), for powering the pivot mechanism 60. The drive mechanism 52 is preferably a remotely controlled drive mechanism 52 that can be controlled by a user in the operator's station 16 of the combine 10. The drive mechanism 52 is also operatively connected to a motor 62 for driving rotation of the drive mechanism 52.

Figure 13:
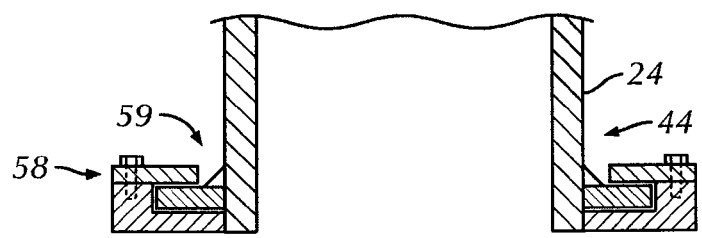
FIG. 13 is a side, cross-sectional, elevational view of a turret in accordance with a preferred embodiment of the present invention.

The drive mechanism 52 (FIGS. 6A and 6B) includes a turret 58 and at least one pivot mechanism 60. The drive mechanism 52 (FIG. 6A) via turret 58 rotates about a substantially vertical central axis B (FIG. 5) of the discharge end 44 so as to provide rotation of the extension 32. The drive mechanism 52 is also configured to pivot via pivot mechanism 60 about central axis B (FIG. 5). The turret 58 is configured to pivot about a pivot joint 59 (FIG. 13) so as to rotate about axis B. The turret 58 can also include a motor 62 or actuator for providing rotational movement and securing the extension 32 in a fixed position. The pivot mechanism 60 provides for pivotal movement of the extension 32 relative to axis B i.e., the axis of rotation of turret 58. The pivot mechanism 60 can be any an electro-mechanical actuator, a linear actuator, hydraulic cylinder, or the like. The turret 58 and pivot mechanism 60 can also be configured as manually operated mechanical mechanisms.

The pivot mechanism 60 can be attached to one of the lateral sides 36 or 38 of the extension 32, such that the extension 32 can be raised or lowered relative to its pivot end, as further described below. The pivot mechanism 60 can optionally be configured with two pivot mechanisms (only one shown in FIG. 6B) for attachment with each of the lateral sides 36, 38.

Figure 7A:
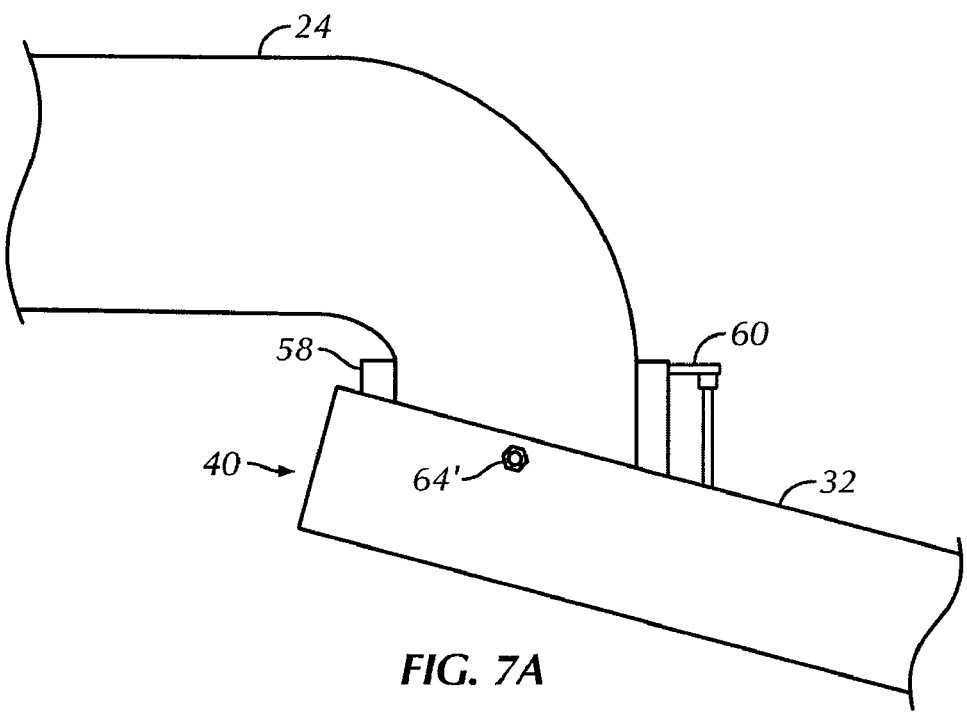
FIG. 7A is an enlarged side elevational view of the unloader extension of FIG. 4 connected to the unloader tube of FIG. 5 in a discharge position in accordance with another preferred aspect of the present invention.

As shown in FIG. 7, the extension 32 is pivotably connected to the unloader tube 24 about its inlet end 40 via turret 58. Alternatively, the extension 32 can be pivotably connected to the unloader 24 about diametrically opposite sides of the turret 58, as shown in FIG. 7A. The extension 32 can be pivotally attached by a nut and bolt configuration 64, 64'. FIGS. 7 and 7A illustrate the extension 32 in the discharge position so as to allow for the flow of crop material from the discharge end 44 of the unloader 24 to the outlet end 42 of the extension 32. FIG. 8 illustrates the extension 32 in the closed position. In addition to the benefits further described below, the drive mechanism 52 also allows for the extension 32 to be folded substantially parallel to the unloader tube 24 when in the closed position, such that the unloading system does not extend further out or rearward than on conventional combines.

As shown in FIG. 8, the discharge end 44 is correspondingly configured with the extension 32 to prevent crop material from discharging from the unloader tube 24 when the extension 32 is in the closed position. That is, the extension 32 includes a surface, such as the bottom portion 34, that is configured to sealingly engage the discharge opening 48 of the unloader tube 24 when in the closed position. This advantageously prevents any residual crop material remaining in the unloader tube 24, after the unloading operation has ceased, from dribbling or falling out while the combine 10 is thereafter used for further harvesting.

Figure 9:
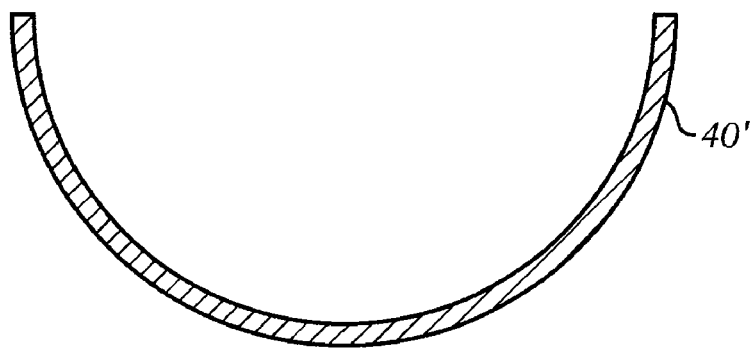
FIG. 9 is a front, cross-sectional view of an unloader extension having a half-piped configuration in accordance with another preferred embodiment of the present invention.
Figure 10:
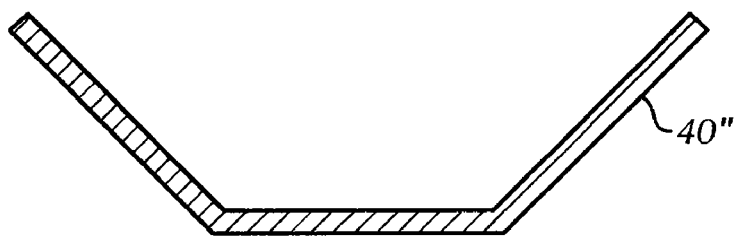
FIG. 10 is a front, cross-sectional view of an unloader extension having a open trapezoidal configuration in accordance with yet another preferred embodiment of the present invention.

The extension 32 can alternatively be configured with various configurations, such as a half pipe configuration 40' (FIG. 9), an open trapezoidal configuration 40" (FIG. 10) and the like.

Figure 11:
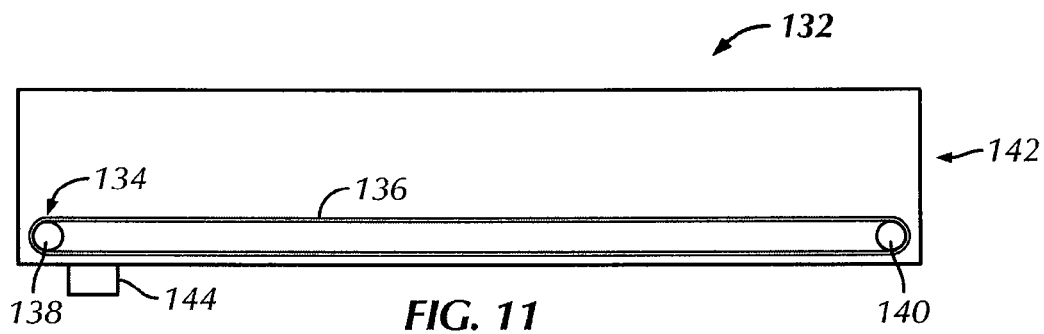
FIG. 11 is a side, elevational view of an unloader extension having a powered conveyor belt in accordance with another preferred embodiment of the present invention.
Figure 12:
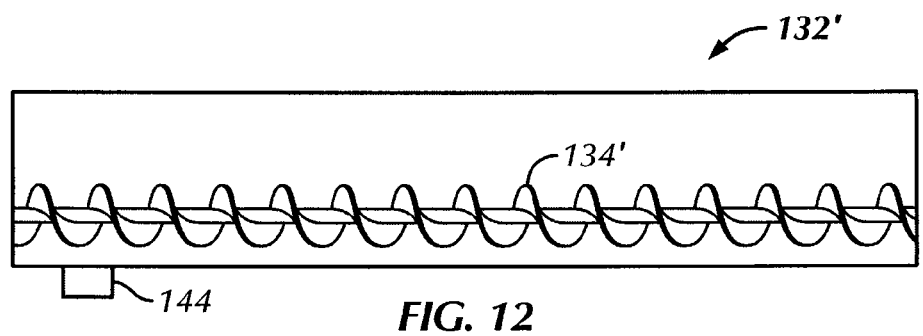
FIG. 12 is a side, elevational view of an unloader extension having a powered auger conveyor in accordance with yet another preferred embodiment of the present invention.

In yet another embodiment, the extension 32 can be configured as a powered extension 132 (see FIG. 11). The powered extension 132 can be configured with a powered drive conveyor 134 to further propel the grain during unloading into the grain cart 100. The conveyor 134 can be a belt conveyor 134, a screw auger 134' (FIG. 12), or the like. Preferably, the conveyor 134 is a belt conveyor 134 that includes an endless belt 136 that travels around a pair of rollers 138, 140 at opposite ends of the powered extension 132. The powered extension 132 can be driven by a motor 144 operatively connected to the rollers 138, 140 for driving the belt conveyor 134 (FIG. 11) or a motor 144' operatively connected to the screw auger 134' (FIG. 12). The motor 144, 144' in turn can be connected to any power source, such an electrical battery or engine alternator (not shown) located on the combine 10 and remotely controlled by the operator.

Figure 2:
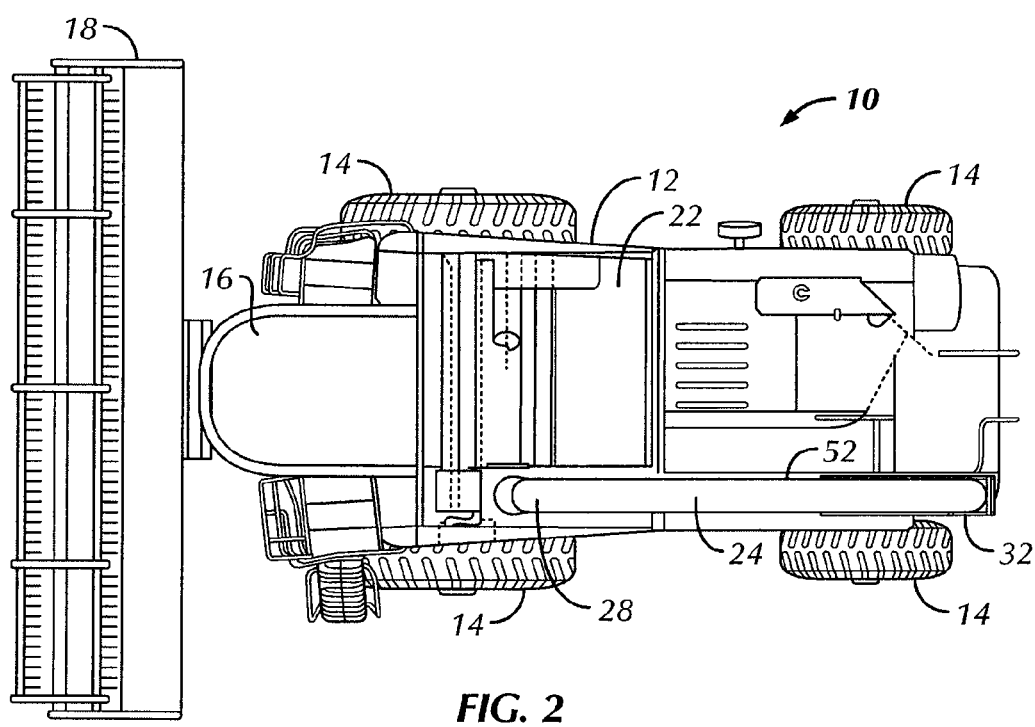
FIG. 2 is a top plan view of the agricultural combine of FIG. 1.

In operation, the unloader tube 24 is moved from its initial storage or closed position, as shown in FIG. 2 to its unloading or discharging position, as shown in FIG. 3. That is, the unloader tube 24 is moved substantially outwardly to the combine's lateral side for unloading operations. For use with a grain cart 100 for example, the length of the horizontal section 30 of the unloader tube 24 and extension 32 extends from the unloader tube's infeed section 26 to the center of the grain cart 100. This extension length of the unloader tube 24 and extension 32 includes one-half the width of the header 18, the safety gap between the end 106 of the header 18 and the tractor's tires 104, and half of the width of the tractor 102. In sum, the unloader tube 24 and extension 32 extend beyond the ends of the header 18.

Referring back to FIGS. 6A and 6B, the drive mechanism 52 is activated to move the extension 32 from the closed/storage position, to the discharge position, as shown in FIGS. 3 and 7. The turret 58 rotates the extension 32 to extend further outwardly such that the outlet end 42 substantially reaches the grain cart 100. The pivot mechanism 60 pivots the extension 32 to allow the passage of crop material to flow out of the unloader tube 24 and thereafter pass through the extension 32. Preferably, the extension 32 is pivoted and angled downwardly from the discharge end 44 such that the flow of crop material travels downhill.

If the extension is a powered extension 132 (FIG. 11), then the powered extension 132 can be turned on to further facilitate the flow of crop material through the powered extension 132. In operation with the powered extension 132, in addition to being angled downwards, the powered extension 132 can also be angled upwards to project the crop material about an arc into the grain cart 100. When angled upwards the turret 58 is configured to lower the powered extension 132 sufficiently to allow for clearance of the crop material between the discharge end 142 and the powered extension 132. Once the combine's onboard storage bin 22 has been emptied or the grain cart 100 has been filled, the previously explained steps can be reversed to place the powered extension 132 in the closed position to prevent dribbling waste of the grain and the unloader tube 24 back in the storage position.

The unloader tube 24 can also be used to fill a grain cart 100 that is towed behind the combine 10 instead of an adjacent truck or grain cart 100. In this alternative, the extension 32 would be rotated rearward so that it is basically coaxial with the unloader tube 24. However, the fully extended unloader tube 24 and extension 32 would not be rotated out into the previously described laterally extending position. Instead, the unloader tube 24 and extension 32 would be left to extend rearwardly beyond the rear end of the combine 10 so that the extension 32 can access a grain cart 100 being towed behind the combine 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. An agricultural combine unloader comprising:
    an unloader tube connected to the agricultural combine, the unloader tube extending substantially horizontally with respect to the agricultural combine, the unloader tube including:
    an interior passageway, and
    an auger within the interior passageway for conveying crop material therethrough to a discharge end, wherein the discharge end of the unloader tube includes an opening, wherein the opening is a downwardly facing opening;
    an unloader extension coupled to the discharge end, the unloader extension includes:
    an inlet end for receiving crop material from the discharge end of the unloader tube,
    an outlet end for discharging the crop material, and
    an upwardly facing surface connecting the inlet and outlet ends; and a drive mechanism operatively connected to the discharge end of the unloader tube to selectively position the unloader extension in at least a discharge position to discharge the crop material from the unloader tube and a closed position to cover the discharge end of the unloader tube, the drive mechanism including a turret and the turret rotates about a substantially vertical axis, wherein the inlet end of the unloader extension is pivotably connected to the turret, the drive mechanism further includes a pivot mechanism operatively connected to the unloader extension to pivot the unloader extension about a substantially horizontal axis, wherein the unloader extension is substantially parallel to the unloading tube in the both the discharge and closed position, further wherein the unloading extension is vertically disposed along the substantially vertical axis under the discharge opening of the unloading tube.

2. The agricultural combine unloader of claim 1, wherein the drive mechanism includes a pivot joint and a motor for driving rotation of the turret about the pivot joint.

3. The agricultural combine unloader of claim 2, wherein the drive mechanism is a remotely controlled drive mechanism.

4. The agricultural combine unloader of claim 1, wherein the pivot mechanism includes an electro-mechanical actuator, a linear actuator, and/or a hydraulic cylinder.

5. The agricultural combine unloader of claim 1, wherein the unloader extension and the discharge end of the unloader tube are correspondingly configured to prevent crop material from discharging from the unloader tube when the unloader extension is in the closed position.

6. The agricultural combine unloader of claim 1, wherein the discharge end of the unloader tube includes an opening and the unloader extension includes a surface configured to sealingly engage the opening when the unloader extension is in the closed position.

7. The agricultural combine unloader of claim 6, wherein the opening is a downwardly facing planar opening and the surface of the unloader extension is a substantially planar surface.

8. The agricultural combine unloader of claim 1, wherein the unloader extension further includes a powered drive conveyor to discharge the crop material from the unloader extension.

9. The agricultural combine unloader of claim 8, wherein the conveyor is an auger or a conveyor belt.

10. The agricultural combine unloader of claim 1, wherein the unloader extension is substantially parallel to the unloader tube when in the closed position.

11. An agricultural combine unloader comprising:
an unloader tube connected to the agricultural combine, the unloader tube extending substantially horizontally with respect to the agricultural combine, the unloader tube including:
an interior passageway, and
an auger within the interior passageway for conveying crop material therethrough to a discharge end having a downwardly facing opening;
an unloader extension coupled to the discharge end that includes:
an inlet end for receiving crop material from the discharge end of the unloader tube,
an outlet end for discharging the crop material, and
an upwardly facing surface connecting the inlet end and outlet end;
a drive mechanism that includes:
a turret operatively connected to the discharge end of the unloader tube for rotation about a substantially vertical axis, and
a pivot mechanism,
wherein the inlet end of the unloader extension is pivotably connected to the turret and the pivot mechanism is operatively connected to the unloader extension to pivot the unloader extension about a substantially horizontal axis; and
wherein the pivot mechanism pivots the unloader extension between a closed position wherein the planar surface of the unloader extension covers the downwardly facing opening of the discharge end of the unloader tube and an open position wherein the upwardly facing surface of the unloader extension is at an angle with respect to horizontal to allow for the flow of crop material from the discharge end of the unloader tube to the outlet end of the unloader extension, wherein the unloader extension is substantially parallel to the unloading tube in the both the discharge and closed position, further wherein the unloading extension is vertically disposed along the substantially vertical axis under the discharge opening of the unloading tube.

* * * * *